United States Patent [19]

Mizutani

[11] Patent Number: 4,643,858

[45] Date of Patent: Feb. 17, 1987

[54] PROCESS FOR PREPARATION OF SINTERED SILICON NITRIDE BODY

[75] Inventor: Michitaka Mizutani, Tsu, Japan

[73] Assignee: Kyocera Corporation, Japan

[21] Appl. No.: 708,087

[22] Filed: Mar. 5, 1985

[30] Foreign Application Priority Data

Jun. 3, 1984 [JP] Japan .................................. 59-43577

[51] Int. Cl.$^4$ ....................... C04B 33/34; C04B 35/58
[52] U.S. Cl. ........................................ 264/62; 264/65;
  264/570; 428/689; 428/697; 428/698
[58] Field of Search ............................ 264/62, 570, 65

[56] References Cited

U.S. PATENT DOCUMENTS 4,242,294 12/1980 Hüther et al. .......................... 264/62
4,310,477 1/1982 Uy ......................................... 264/62
4,462,817 7/1984 Wolfe ..................................... 264/62

Primary Examiner—James Derrington
Attorney, Agent, or Firm—Spensley Horn Jubas & Lubitz

[57] ABSTRACT

In preparing a sintered silicon nitride body by hot isostatic pressing, if a green molded body of silicon nitride and a sintering aid is coated with a compound of high melting point cyrstalline powder (sintering aids of silicon nitride), said crystalline compound works as a pressure media on HIP treatment and is present in the surface of the sintered body. By the presence of this crystal, hot isostatic pressing of this dual density compact mentioned above results surface compression stress, which results not only the strength at room temperature but also the strength at high temperatures is highly improved.

18 Claims, No Drawings

PROCESS FOR PREPARATION OF SINTERED SILICON NITRIDE BODY

BACKGROUND OF THE INVENTION (1) Field of the Invention

The present invention relates to a process for the preparation of a sintered (dense) silicon nitride body excellent in the strength at high temperatures. More particularly, the present invention relates to a process for preparing a sintered silicon nitride body having an improved surface texture by hot isostatic pressing. Furthermore, the present invention relates to a novel sintered silicon nitride body prepared according to this process.

(2) Description of the Prior Art

Recently, the HIP process (hot isostatic pressing) has attracted attention as means for sintering a ceramic material to full density with use of a small amount of sintering aids, and for treating various materials. Especially for obtaining a sintered body having a complicated shape from a molded powder, there is mainly adopted a so-called glass capsule process in which powder or powder compact, a green molded body or a pre-sintered body is filled in a glass (Vycor or Pyrex) vessel and is preliminarily heated under compression by an inert gas at a temperature close to the softening point of the glass vessel to cover the periphery of the compressed body with the glass, the interior powder, green molded body or pre-sintered body is densified in a high-temperature high-pressure gas by using the covering glass layer as a pressure-transmitting medium, and the intended sintered body is obtained by removing the glass from the periphery of the formed sintered body by using a dissolving solution or with the sand blasting method.

This process, however, is defective in that since a large quantity of the softened glass component intrudes in the grain boundary phase of the sintered body, the strength at high temperatures is drastically reduced.

SUMMARY OF THE INVENTION

It is a primary object of the present invention to provide a sintered silicon nitride body having an improved surface texture and being excellent in not only the strength at room temperature but also the strength at high temperatures according to the HIP process and a process for preparing this sintered body.

Another object of the present invention is to provide a sintered silicon nitride body in which high-melting-point crystals intrude in the crystal grain boundary phase in the surface of the sintered silicon nitride body during the HIP process.

Still another object of the present invention to provide a sintered silicon nitride body in which the surface of the sintered body has a surface compression exceeding a certain critical level and hence, the strengths at ambient of high temperatures are prominently improved.

In accordance with one fundamental aspect of the present invention, there is provided a process for the preparation of a sintered silicon nitride body, which comprises the steps of (i) molding a silicon nitride powder containing a sintering aid according to need into a predetermined shape to obtain a green molded body, (ii) calcining the mixture of silicon nitride and an oxide of an element of the group IIIa of the Periodic Table to prepare a compound of the N-melilite type crystal structure and dispersing said compound in a liquid medium to form a slurry, or calcining the mixture of alumina and an oxide of an element of the group IIa of the Periodic Table to prepare a compound of the garnet type crystal structure and dispersing said compound in a liquid medium to form a slurry, (iii) coating the slurry formed at the step (ii) on the surface of the green molded body obtained at the step (i), (iv) preliminarily sintering the coated molded body obtained at the step (iii) in an inert atmosphere, and (v) subjecting the preliminarily sintered body obtained at the step (iv) to hot isostatic pressing in an atmosphere of an inert gas such as nitrogen.

In accordance with another fundamental aspect of the present invention, there is provided a sintered silicon nitride body formed by hot isostatic pressing of a silicon nitride powder containing a sintering aid according to need, said sintered body comprising (i) a core formed by sintering a silicon nitride powder containing a sintering aid according to need and (ii) a skin of sintered silicon nitride containing in the crystal grain boundary at least one member selected from (a) a compound composed of silicon nitride and an oxide of an element of the group IIIa of the Periodic Table and having an N-melilite type crystal structure and (b) a compound composed of alumina and an oxide of an element of the group IIIa of the Periodic Table and having a garnet type crystal structure, such as an Al-rare earth element composite oxide, wherein the sintered body has a surface compression stress of at least 1 kg/mm$^2$ as determined according to the X-ray stress measuring method.

DETAILED DESCRIPTION OF THE PREFERRED EMBODIMENTS

According to the present invention, a slurry comprising a synthesized crystalline powder having a high melting point is coated on the periphery of a green molded body of $Si_3N_4$ by coating, dipping or spraying, and the coated molded body is calcined to sinter the outer coating layer prior to the interior core. Then, the coated molded body is subjected to the HIP treatment, whereby the dense skin layer formed prior to the HIP treatment is utilized as the pressure-transmitting medium for forming the dense sintered core and the crystal of the outer layer is often intruded in the grain boundary phase from the surface of the inner $Si_3N_4$ to form a crystal structure in which the melting point is gradually elevated toward the outer layer from the interior of the sintered body. Accordingly, the contraction ratio at the HIP sintering treatment is gradually reduced toward the outer layer from the interior and hence, the interior is contracted while the outer layer is sintered and densified, with the result that a surface compression stress is produced in the outer layer.

When the periphery of the $Si_3N_4$ molded body is coated with the above-mentioned slurry and the HIP treatment is carried out, the above-mentioned synthesized crystalline powders as the sintering aid intrudes into the inner grain boundary phase from the surface of the $Si_3N_4$ molded body to promote sintering of the molded body. Accordingly, the sintered body comes to have a crystal structure in which the melting point is gradually elevated toward the outer layer from the interior of the sintered body. According to the HIP sintering of the conventional glass capsule process, a large quantity of the low melting point glass component degrading the strength at high temperatures intrudes in the grain boundary phase on the surface of the $Si_3N_4$ molded body. On the other hand, according to the present invention, even if the outer sintered layer which originally only act as pressure transmitting layer may intrude into the grain boundary phase on the surface of the $Si_3N_4$ molded body, on hot isostatic pressing the coated molded body, as the crystal phase has a high melting point as a sintering aid, the strength at high temperature is prominently improved. Simultaneously, at the time of HIP treatment, the inner portion (core) of the sintered body is more contracted than the dense outer layer (skin), with the result that the surface compression stress is produced in the sintered body and the flexural strength of the sintered body per se is improved. If the surface compression stress of the sintered body is lower than 1 $kg/mm^2$, the strength at high temperatures is comparable to the strength at high temperatures attainable by the conventional glass capsule process (sintering on HIP) and no improvement of the strength characteristics can be attained.

In the present invention, $Si_3N_4$ having an $\alpha$-type or $\beta$-type crystal structrure is used as the silicon nitride. At least one member selected from oxides of elements of the group IIIa of the Periodic Table (rare earth elements), alumina, aluminum nitride, titania, chromium oxide ($Cr_2O_3$), beryllia and magnesia is used as the sintering aid. Incorporation of the sintering aid is not indispensably necessary, but it is preferred that the sintering aid be incorporated in an amount of up to 50% by weight, especially up to 10% by weight, particularly especially up to 5% by weight, based on $Si_3N_4$.

Molding of the above composition is accomplished after incorporation of a binder such as a was by known molding means such as compression molding, injection molding or cold isostatic pressing.

The slurry to be coated on the green molded body prepared according to the above method is prepared in the following manner. More specifically, silicon nitride is mixed with an oxide ($R_2O_3$) of an element of the group IIIa of the Periodic Table, such as $Y_2O_3$, $La_2O_3$, $Yb_2O_3$ or $Sm_2O_3$, and the mixture is heated in an inert atmosphere to effect reaction between the two components, whereby a high-melting-point compound having an N-melilite type crystal structure is formed. It is preferred that $Si_3N_4$ and $R_2O_3$ be mixed at an equimolar ratio, but the $Si_3N_4/R_2O_3$ ratio may be changed within a range of from 1/3 to 3/1. A heating temperature causing reaction between $Si_3N_4$ and $R_2O_3$ is sufficient, but it is ordinarily preferred that the heating temperature be higher than 1400° C. It is preferred that the formed crystalline compound should have a melting point higher than 1600° C. The formed product is wet-pulverized in a liquid medium such as water or alcohols to form a coating slurry. It is preferred that the solid content in the coating slurry be 20 to 50% by weight.

According to another embodiment, a high-melting-point compound, such as an aluminum-rare earth element composite oxide, is used instead of the above-mentioned compound of the N-melilite crystal structure. The compound as the garnet type crystal structure is prepared in the same manner as described above except that alumina and an oxide ($R_2O_3$) of an element of the group IIIa of the Periodic Table are used and they are heated at 1300° to 1800° C. to effect reaction.

Coating of the green molded body with the above-mentioned slurry is accomplished by customary means such as dipping, coating or spraying.

It is preferred that the amount, as solids, of the coating layer of the slurry be 0.01 to 0.5 part by weight, especially 0.02 to 0.2 part by weight, per part by weight of the $Si_3N_4$ green molded body. If the amount of the coating layer is smaller than 0.01 part by weight, the thickness of the above-mentioned crystalline layer intruding into the surface of $Si_3N_4$ is very small or this crystalline layer is not formed and attainment of the covering effect (the interior-sealing effect) at the HIP treatment cannot be expected, with the result that the inner molded body is directly exposed to the nitrogen pressure and the treatment is not different form the ordinary gas pressure sintering treatment, and the flexural strength is not improved. If the amount of the coating layer is larger than 0.5 part by weight, the amount of the inner $Si_3N_4$ green molded body is too small, and the above-mentioned difference of contraction by sintering is not brought about and no sufficient surface compression stress can be obtained. Moreover, since the entire composition of the molded body is greatly deviated, the desired strength at high temperatures cannot be obtained.

The coated green molded body is dried according to need and is then preliminarily sintered under atmospheric pressure, elevated pressure or reduced pressure. Ordinarily, preliminary sintering is carried out in an inert atmosphere at a temperature of 1500° to 1800° C. for 0.5 to 5 hours.

Hot isostatic pressing is accomplished by filling the preliminarily sintered coated molded body in an apparatus comprising a pressure cylinder and top and end closures and having in the interior thereof an insulator mantle, a support and a heating element arranged on the inner side of the insulator mantle, and heating the molded body while feeding an inert gas under pressure into the apparatus. Generally, pressurization to 1500 to 2000 atmospheres (gauge) and heating to a temperature of 1500° to 2000° C. are effective for this hot isostatic pressing. A nitrogen gas is advantageously used as the inert gas, but argon or the like may be used.

The sintered body obtained by the HIP treatment is polished by sand blasting or the like according to need, and a final product is thus obtained.

The sintered silicon nitride body of the present invention has a novel structure in which at the surface of a core formed by sintering of a silicon nitride powder containing a sintering aid according to need, a skin of a compound of the N-melilite crsytal type or garnet crystal type, such as an Al-rare earth element composite oxide, intruded in the grain boundary phase of silicon nitride, is formed. Furthermore, in the present invention, since the above-mentioned dense skin layer is formed prior to HIP treatment and the dense sintered core is formed while utilizing this skin layer as the pressure-transmitting medium, the sintered silicon nitride body is characterized in that the surface compression stress is produced in the skin layer and the flexural strength of the sintered body is prominently improved. Moreover, in this skin layer, a high-melting-point crystal phase, instead of low-melting-point glass, is intruded in the crystal grain boundary phase, and therefore, the above-mentioned excellent flexural strength is maintained even at high temperatures.

The presence of the surface compression stress in the surface of the sintered body and the volume of this stress can be determined by measuring the crystal strain due to the stress with the X-ray diffractometer.

More specifically, if the lattice spacing d of the crystal is changed by Δd, the X-ray diffraction angle θ is changed by Δθ. Since this change Δθ of the diffraction angle cannot be directly known, diffraction angles 2θ of several incident angles ψ are determined and plotted relatively to $\sin^2\psi$, and the gradient $\partial 2\theta/\partial \sin^2\psi(\tan \alpha)$ is determined. The residual stress σ (kg/mm²) is calculated according to the following formula:

tained at 1850° C. and 2000 atmospheres. Thus, samples Nos. 1 through 8 shown in Table 1 were obtained.

For comparison, a powder of an $Si_3N_4$ molded body having a composition similar to the above composition was filled in a Vycor or Pyrex vessel and the HIP treatment was carried out under the same conditions as described above to obtain samples Nos. 9 through 12 as comparative samples.

The properties of the so-obtained samples were determined. The obtained results are shown in Table 1.

TABLE 1

| Sample No. | Composition of Slurry (high-melting-point oxide crystal) | Composition (% by weight) of Molded Body | | | Melting Point (°C.) | Bulk Specific Gravity | Flexural Strength (Kg/mm²) at Room Temperature | Flexural Strength (Kg/mm²) at 1300° C. | Surface Compression Stress (Kg/mm²) |
|---|---|---|---|---|---|---|---|---|---|
| | | $Si_3N_4$ | $Y_2O_3$ | $Al_2O_3$ | | | | | |
| 1 | $Si_3N_4$—$Y_2O_3$ | 95 | 3 | 2 | above 1800 | 3.27 | 98 | 85 | 13 |
| 1a | $Si_3N_4$—$Y_2O_3$ | 100 | 0 | 0 | above 1800 | 3.24 | 93 | 81 | 10 |
| 2 | $Si_3N_4$—$La_2O_3$ | 95 | 3 | 2 | above 1800 | 3.28 | 86 | 72 | 11 |
| 3 | $Si_3N_4$—$Yb_2O_3$ | 95 | 3 | AlN, 2 | above 1800 | 3.26 | 101 | 92 | 7 |
| 4 | $Si_3N_4$—$Sm_2O_3$ | 95 | 3 | 2 | above 1800 | 3.25 | 110 | 98 | 10 |
| 5 | $Al_2O_3$—$Y_2O_3$ | 95 | 3 | 2 | above 1800 | 3.29 | 115 | 65 | 8 |
| 6 | $Al_2O_3$—$La_2O_3$ | 95 | 3 | $TiO_2$, 2 | above 1800 | 3.26 | 88 | 70 | 5 |
| 7 | $Al_2O_3$—$Yb_2O_3$ | 95 | 3 | $Cr_2O_3$, 2 | above 1800 | 3.27 | 111 | 79 | 6 |
| 8 | $Al_2O_3$—$Sm_2O_3$ | 95 | 3 | 2 | above 1800 | 3.26 | 75 | 63 | 7 |
| 9* | Pyrex | 95 | 3 | 2 | up to 800 | 3.28 | 55 | 5 | <1 |
| 10* | pyrex | 95 | 3 | 2 | " | 3.29 | 42 | 0 - cracking | <1 |
| 11* | Vycor | 95 | 3 | 2 | " | 3.27 | 34 | 3 | <1 |
| 12* | Vycor | 95 | 3 | 2 | " | 3.28 | 37 | 0 - cracking | <1 |

Note
*outside the scope of the present invention $$\sigma = -\frac{E}{2(1+\nu)} \cdot \cot\theta \cdot \frac{\partial 2\theta}{\partial \sin^2\phi}$$

wherein E stands for the elastic constant (kg/mm²) and ν stands for Poisson's ratio.

The present invention will now be described in detail with reference to the following example that by no means limits the scope of the invention.

EXAMPLE

An equimolar powder mixture comprising $Si_3N_4$ and $Y_2O_3$, $La_2O_3$, $Yb_2O_3$ or $Sm_2O_3$ was reacted at 1700° C. for 5 hours in a nitrogen atmosphere of at least 1 atmosphere to prepare a composite oxide/nitride containing an N-melilite crystal structure (for example, $Si_3N_4$—$Y_2O_3$) as a preferred grain boundary compound of $Si_3N_4$. This composite oxide/nitride was pulverized for 72 hours by using silicon nitride balls and a slurry containing the composite nitride/oxide was formed. Separately, an equimolar mixture of $Al_2O_3$ and $Y_2O_3$, $La_2O_3$, $Yb_2O_3$ or $Sm_2O_3$ was sintered in air at 1400° to 1600° C. to synthesize a composite oxide having a composite oxide type crystal structure (for example, $Al_2O_3$—$Y_2O_3$), and the composite oxide was pulverized for 72 hours by using alumina balls and a slurry containing a crystal having a high melting point exceeding 1800° C. was prepared.

The slurry thus obtained was coated on the periphery of a green molded body having a composition shown in Table 1, and the coated molded body was calcined at 1650° to 1800° C. in a nitrogen atmosphere maintained at 0.5 to 9.8 atmospheres (absolute) and then subjected to the HIP treatment in a nitrogen atmosphere main- In each of samples Nos. 1 through 8 obtained by coating a high-melting-point crystalline composition on a molded body of $Si_3N_4$ and subjecting the coated molded body to the HIP treatment, the flexural strength at room temperature is excellent and at least 75 kg/mm², which is much higher than the flexural strength of samples Nos. 9 through 12, which is in the range of from 34 to 55 kg/mm². Especially, the flexural strength at room temperature of sample No. 5 is as high as 115 kg/mm². When these sintered bodies are heated at 1300° C. and the strength is measured, samples Nos. 9 through 12 are broken by cracking or the strength is about 3 to about 5 kg/mm², while the strength of samples Nos. 1 through 8 is excellent and is at least 63 kg/mm². Especially, the strength of sample No. 4 is excellent and is as high as 98 kg/mm².

As is apparent from the foregoing illustration, in a sintered body obtained by coating the periphery of a green molded body of $Si_3N_4$ with a slurry of a high-melting-point crystalline composition containing an oxide of an element of the group IIIa of the Periodic Table and subjecting the coated molded body to the HIP treatment, the surface compression stress due to the difference of the quantity of contraction by sintering between the core and skin at the HIP treatment is at least 1 kg/mm².

I claim:
1. A process for the preparation of a sintered silicon nitride body, which comprises the steps of (i) molding a silicon nitride powder into a predetermined shape to obtain a green molded body, (ii) reacting by heating a mixture of silicon nitride and an oxide of an element of the group IIIa of the Periodic Table to prepare a compound of the N-melilite type crystal structure and dispersing said compund in a liquid medium to form a slurry, (iii) coating the slurry formed at the step (ii) on the surface of the green molded body obtained at the step (i), (iv) preliminarily sintering the coated molded body obtained at the step (iii) in an inert atmosphere, and (v) subjecting the preliminarily sintered body obtained at the step (iv) to hot isostatic pressing in an inert atmosphere.

2. A process for the preparation of a sintered silicon nitride body, which comprises the steps of (i) molding a silicon nitride powder into a predetermined shape to obtain a green molded body, (ii) reacting by heating a mixture of alumina and an oxide of an element of the group IIIa of the Periodic Table to prepare a compound of the composite oxide type crystal structure and dispersing said compound in a liquid medium to form a slurry, (iii) coating the slurry formed at the step (ii) on the surface of the green molded body obtained at the step (i), (iv) preliminary sintering the coated molded body obtained at the step (iii) in an inert atmosphere, and (v) subjecting the preliminarily sintered body obtained at the step (iv) to hot isostatic pressing in an inert atmosphere.

3. The process according to claim 1 wherein the oxide of an element of the group IIIa of the Periodic Table is selected from the group consisting of $Y_2O_3$, $La_2O_3$, $Yb_2O_3$, and $Sm_2O_3$.

4. The process according to claim 1 wherein the silicon nitride ($Si_3N_4$) and the oxide of the element of group IIIa of the Periodic Table ($R_2O_3$) are mixed at a molar ratio from 1:3 to 3:1.

5. The process according to claim 4 wherein the silicon nitride ($Si_3N_4$) and the oxide of the element of group IIIa of the Period Table ($R_2O_3$) are mixed at approximately an equimolar ratio.

6. The process according to claim 1 wherein the heating of the mixture is at a heating temperature higher than 1400° C., and wherein the compound has a melting point higher than 1600° C.

7. The process according to claim 1 wherein the amount, as solids, of the coating of slurry formed on the surface of the green molded body at step (iii) is 0.01 to 0.5 part by weight of the silicon nitride green molded body.

8. The process according to claim 1 wherein the (iv) preliminarily sintering is carried out at a temperature of 1500° to 1800° C. for a period of 0.5 to 5 hours.

9. The process according to claim 1 wherein the inert atmosphere is nitrogen.

10. The process acording to claim 1 wherein the inert atmosphere is argon.

11. The process according to claim 2 wherein the oxide of an element of the group IIIa of the Periodic Table is selected from the group consisting of $Y_2O_3$, $La_2O_3$, $Yb_2O_3$, and $Sm_2O_3$.

12. The process according to claim 2 wherein the alumina and the oxide of the element of group IIIa of the Periodic Table ($R_2O_3$) are mixed at a molar ratio from 1:3 to 3:1.

13. The process according to claim 12 wherein the alumina and the oxide of the element of group IIIa of the Period Table ($R_2O_3$) are mixed at approximately an equimolar ratio.

14. The process according to claim 2 wherein the heating of the mixture is at a heating temperature of 1300° to 1800° C.

15. The process according to claim 2 wherein the amount, as solids, of the coating of slurry formed on the surface of the green molded body of step (iii) is 0.01 to 0.5 part by weight of the silicon nitride green molded body.

16. The process according to claim 2 wherein the (iv) preliminarily sintering is carried out at a temperature of 1500° to 1800° C. for a period of 0.5 to 5 hours.

17. The process according to claim 2 wherein the inert atmosphere is nitrogen.

18. The process according to claim 2 wherein the inert atmosphere is argon.

* * * * *